United States Patent [19]

Mochizuki et al.

[11] Patent Number: 5,296,985
[45] Date of Patent: Mar. 22, 1994

[54] MAGNETIC DISK UNIT USING NEGATIVE PRESSURE TO COUNTERBALANCE HAVING HEAD LIFTING MECHANISM

[75] Inventors: Masanobu Mochizuki; Masanori Iwabuchi, both of Ibaragi, Japan

[73] Assignee: NEC Corporation, Tokyo, Japan

[21] Appl. No.: 767,765

[22] Filed: Sep. 30, 1991

[30] Foreign Application Priority Data

Sep. 28, 1990 [JP] Japan .................. 2-259487

[51] Int. Cl.$^5$ ............................................. G11B 21/22
[52] U.S. Cl. ...................................... 360/105; 360/75; 360/106; 360/128
[58] Field of Search ............... 360/75, 103, 104, 105, 360/106, 128, 137

[56] References Cited

U.S. PATENT DOCUMENTS

| | | | |
|---|---|---|---|
| 4,703,376 | 10/1987 | Edwards et al. | 360/105 |
| 4,939,611 | 6/1990 | Connolly | 360/104 |
| 4,975,794 | 12/1990 | Losee et al. | 360/104 |
| 5,082,827 | 1/1992 | Barnes | 360/105 |

*Primary Examiner*—Constantine Hannaher
*Assistant Examiner*—Kim-Kwok Chu
*Attorney, Agent, or Firm*—Ssughrue, Mion, Zinn, Macpeak & Seas

[57] ABSTRACT

A magnetic disk unit for data storage in which a magnetic read/write head is attached to a suspension arm. To prevent the head from making direct contact with the associated disk when the disk is not rotating, the disk unit is provided with a head lifting mechanism which comprises at least one linearly contractable and extendable bellows mounted on the base of the disk unit, a lifter member fixed to a movable end face of the bellows and a pressure transmitting passage to transmit a negative pressure created within the magnetic disk unit in the vicinity of a radially inner region of the rotating disk to the interior of the bellows. When the disk is stationary the bellows is in the expanded state, and the lifter member supports thereon the suspension arm so as to keep the head spaced from the disk. In read/write operations the negative pressure causes the bellows to contract such that the lifter member remains apart from the suspension arm.

7 Claims, 8 Drawing Sheets

MAGNETIC DISK UNIT USING NEGATIVE PRESSURE TO COUNTERBALANCE HAVING HEAD LIFTING MECHANISM

BACKGROUND OF THE INVENTION

This invention relates to a magnetic disk unit for data storage, and more particularly to a mechanism for preventing a magnetic head in the disk unit from making direct contact with a data storage surface of the associated disk.

In conventional magnetic disk units for data storage, a magnetic head for read/write operations on a data storage surface of a rotating disk is attached to a suspension arm which flies on a thin cushion of air, or air-bearing, created above the rotating disk. To maintain an appropriate clearance between the head and the rotating disk by counterbalancing the air-cushioning force the suspension arm applies loading force to the head so as to urge the head toward the disk. Therefore, when the disk stops rotating the head comes into contact with the disk surface.

Recently there is a trend toward a decrease in the head-disk clearance for the purpose of enhancing the data storage density and thereby increasing the data storage capacity of each disk. To comply with such a trend recent magnetic disks have been improved in surface smoothness, but as an unfavorable effect of the improvement it is not rarely that a head sticks to a disk surface during stationary contact of the head with the disk.

Relatively simple countermeasures to the sticking phenomenon are supplying a large current to a spindle motor installed in a magnetic disk unit for rotating magnetic disks thereby augmenting the generated torque or supplying a large current to a voice coil motor in order to forcibly overcome the sticking. However, these countermeasures are against the requirement for saving of electric power and unsuitable for small-sized computers such a s personal computers of lap-top type using batteries for driving magnetic disk units. Besides, forcible detachment of a sticking head from the disk is liable to damage the disk and/or the head.

As a measure for solving the sticking problem there are proposals of restraining a magnetic head from freely moving toward the associated disk by employing a link mechanism to load the head when the disk is rotating and unload the head when the disk stops rotating. Besides, it has been proposed to keep a magnetic head at a predetermined distance from the associated disk surface when the disk is not rotating by forming a sloped face around the periphery of the disk and shaping the suspension of the head so as to engage and slides on the sloped face. However, the link mechanism is intricate and costly and hence is unsuitable for small-sized disk units used in, for example, personal lap-top computers. The mechanism using a sloped face around the periphery of the disk has a drawback that in the loading and unloading operations the motion of the head becomes oblique with respect to the data storage surface of the disk, not simply vertical to the disk. Due to such motion of the head the loading and unloading positions becomes somewhat indefinite, and there is a problem as to the state of access of the head to the disk.

Meanwhile, magnetic disk units for personal lap-top computers are required to endure shocks that may be applied thereto while the computers are being carried. It is usual to prevent each magnetic head from beating the associated disk surface by augmenting the force to urge the head toward the disk and/or to reduce the weight of each head in order not to seriously damage the associated disk even if the head beats the disk. However, by strongly pressing the head against the disk it is inevitable that friction between the head and the disk increases, and hence large electric power is consumed at the start of rotation of the disk. Therefore, this measure is not very suitable for magnetic disc units in personal lap-top computers. A reduction in the head weight is not always sufficient for realizing desired shock resistance.

SUMMARY OF THE INVENTION

It is an object of the present invention to solve the above explained problems in conventional magnetic disk units by a novel method which overcomes drawbacks of hitherto proposed methods.

More specifically it is an object of the invention to provide a magnetic disk unit including a novel mechanism for surely preventing each magnetic head from making direct contact with a data storage surface of the associated disk when the disk is not rotating, which mechanism is simple in construction and can be incorporated even in small-sized disk units for portable personal computers.

The present invention provides a magnetic disk unit which comprises a rotatable magnetic disk for data storage, a magnetic head which flies above and in close proximity to a data storage surface of the magnetic disk for recording and reading data while the disk is rotating, supporting means for supporting the magnetic head and forcing the head toward the surface of the disk, lifting means for affecting the supporting means so as to lift the magnetic head to a position at a predetermined distance from the data storage surface of the disk, and releasing means for forcing the lifting means to stop affecting the supporting by using a negative pressure created within the magnetic disk unit in the vicinity of a radially inner region of the magnetic disk while the disk is rotating at an operational speed.

A preferred embodiment of the invention is a magnetic disk unit including a base, a spindle motor installed on the base, a magnetic disk for data storage which is rotatably coupled with the spindle motor, a magnetic head which is attached to a free end of a suspension arm for read/write operations on a data storage surface of the magnetic disk and means for supporting the suspension arm and selectively positioning the magnetic head relative to the data storage surface of the disk. According to the invention, the disk unit is provided with a head lifting mechanism comprising a bellows which is linearly contractable and expandable and is mounted on the base, a lifter member fixed to a movable end face of the bellows and a pressure transmitting passage for transmitting a negative pressure created within the magnetic disk unit in the vicinity of a radially inner region of the disk when the disk is rotating at an operational speed to the interior of the bellows. In this mechanism the bellows and the lifter member are arranged such that in the absence of the aforementioned negative pressure the bellows remains in an expanded state and forces the lifter member to support thereon the suspension arm so as to keep the magnetic head spaced from the data storage surface of the disk and such that when the negative pressure is created the bellows contracts to such an extent that the lifter member does not make contact with the suspension arm.

Thus, the invention employs a simple combination of a lifter member and a bellows to support the suspension arm when the disk is not rotating in order to unload the magnetic head and keep the head sufficiently spaced from the disk surface and utilizes a pressure difference produced in the disk unit by the rotation of the disk to separate the lifter member from the suspension arm thereby to allow the suspension arm to urge the head toward the disk surface. By this invention sticking of the head to the disk surface is surely prevented, and at the start of rotation of the disk there is no problem attributed to friction between the head and the disk, such as loss of electric power or damaging the disk surface or the head. In read/write operations the lifter member does not obstruct the seeking motion of the suspension arm, and the suspension arm supporting or freeing motion of the lifter member can be made irrespective of the position of the suspension arm relative to the disk surface. Further, the head lifting mechanism serves the purpose of enhancing the shock resistance of the disk unit not in operation.

The head lifting mechanism according to the invention is relatively simple in construction and does not need any electrically powered actuator. This mechanism is applicable to small-sized disk units for use, for example, personal lap-top computers.

Preferably an elongate beam-like member is used as the lifter member in the present invention by employing a pair of similarly functioning bellows so as to fix one end of the beam-like lifter member to a movable end face of one bellows and the opposite end to a movable end face of the other bellows.

Of course the invention is applicable to a disk unit having a plurality of disks and a plurality of magnetic heads each of which is attached to a suspension arm by providing a lifter member for each suspension arm and using a suitable number of similarly functioning bellows each of which is responsive to the aforementioned negative pressure.

BRIEF DESCRIPTION OF THE DRAWINGS

FIG. 4 shows the heads in the lifted position while the disk is not rotating, and FIG. 5 shows the heads in close proximity to the rotating disk;

DESCRIPTION OF THE PREFERRED EMBODIMENTS

Figure 1:
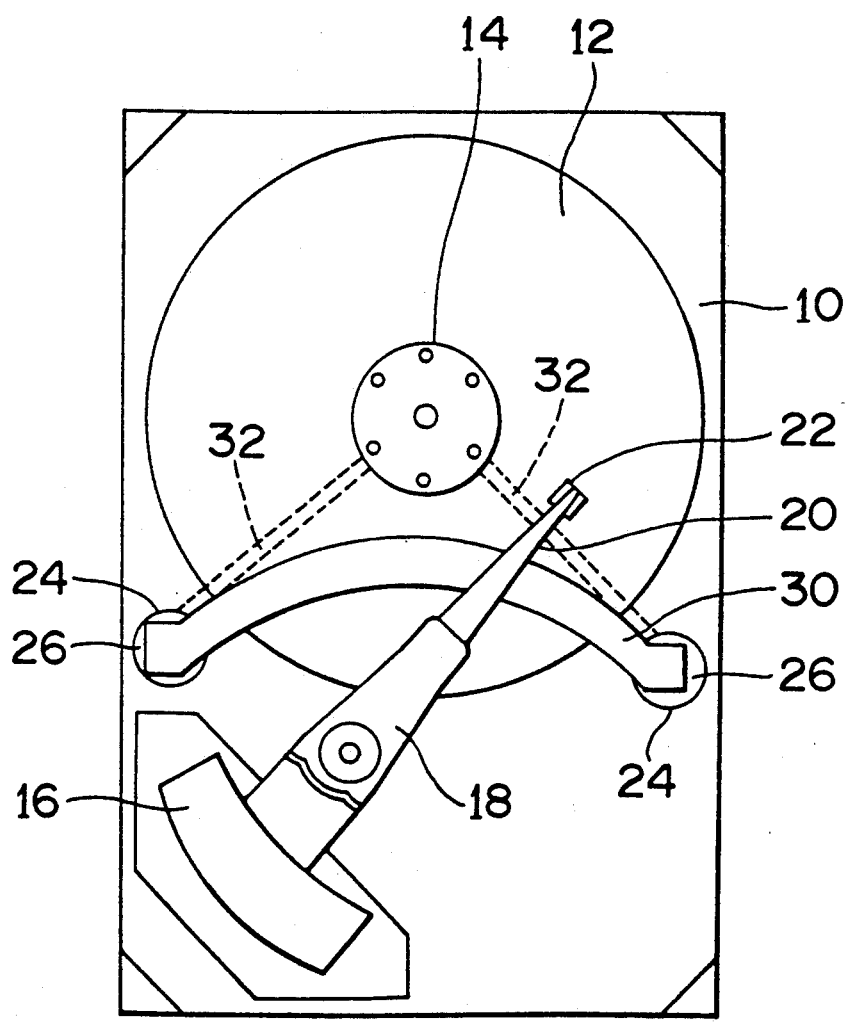
FIG. 1 is a top plan view of a simplified magnetic disk unit which employs a head lifting mechanism according to the invention.
Figure 2:
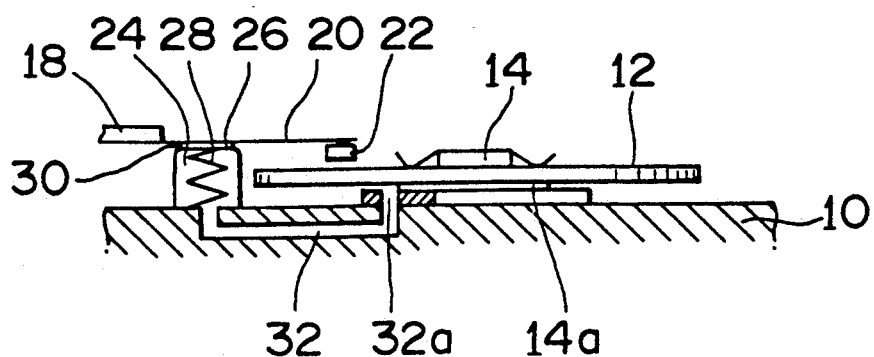
FIG. 2 is a schematic side elevational view, partly in section, of the head lifting mechanism in the disk unit of FIG. 1, showing the head in the lifted position.
Figure 3:
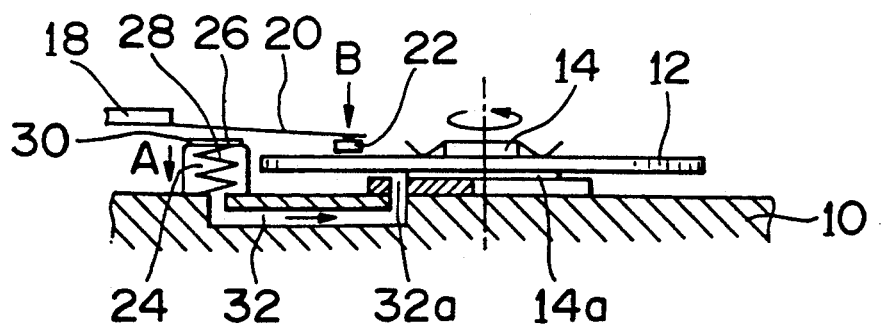
FIG. 3 is a view similar to FIG. 2 but shows the head in the operational position in close proximity above the rotating disk.

To illustrate the fundamental concept of the present invention, FIGS. 1 to 3 show a magnetic disk unit having only one rigid magnetic disk 12 as a magnetic recording medium for data storage and a single magnetic read/write head 22. The disk unit includes a base 10, a spindle motor 14 installed in the base 10 to hold and rotate the disk 12 at a predetermined angular velocity and a head drive unit 16 which is mounted on the base 10 and includes a motor (not shown) and an electrically controllable conventional positioner (not shown). A support arm 18 extends from the head drive unit 16, and a suspension arm 20 is connected to the support arm 18. The magnetic head 22 is attached to the suspension arm 20 at its free end such that the head 22 can make access to the top surface of the disk 12.

According to the invention, two identical bellows 24 are mounted on the base 10 such that, in plan view, the longitudinal axis of the support and suspension arms 18, 20 intersects a straight line drawn to connect the two bellows 24. These bellows 24 are linearly expandable and constractable, and a rising and falling top end of each bellows 24 is closed by an end plate 26, as can be seen in FIG. 2. As shown in FIG. 1 a lifter member 30 in the form of an arcuate beam is fixed at its one end to the top end plate 26 of one bellow 24 and at the opposite end to the top end plate 26 of the other bellows 24 so as to extend transversely through the space between the disk 12 and the suspension arm 20. Referring to FIG. 2, in each bellows 24 a spring 28 biases the top end plate 26 upward against the weight of the lifter member 30 and thereby keeps the bellows 24 in the expanded state. The height of the expanded bellows 24 and the thickness of the lifter member 30 are determined such that when the two bellows 24 are in the expanded state the lifter member 30 makes contact with the suspension arm 20 and pushes up the suspension arm 20 by the force of the spring 28 in each bellows 24 so as to keep the head 22 apart from the top surface of the disk 12.

Each bellows 24 has an opening in the bottom end, and the base 10 of the disk unit is formed with a pressure transmitting passage 32 which extends from the aforementioned opening of each bellows 24 to an opening 32a located in a region near the spindle hub 14a. When the disk 12 is stationary there is no difference between the ambient pressure and the pressure in the interior of each bellows 24, so that the lifter member 30 remains supporting the suspension arm 20 and hence keeps the head 22 separate from the disk 12, as shown in FIG. 2. When the disk 12 is rotated at the operational speed a negative pressure is created in the space between the base 10 and a radially inner region of the disk 12, and by the opening 32a the negative pressure is transmitted to the interior of each bellows 24 through the passage 32 to cause lowering of the pressure in the interior of each bellows 24 from the external ambient pressure. Therefore, the both bellows 24 contract as indicated by arrow A in FIG. 3, and the contraction results in a descent of the lifter member 30 fixed to the bellows 24. Consequently the suspension arm 20 is freed from the support by the lifter member 30, and the head 22 can descend as indicated by arrow B to come very close to the top surface of the roatating disk 12 so as to float on a so-called air bearing. The lifter member 30 in the descended position does not obstruct the seeking motion of the suspension arm 20.

When the spindle motor 14 stops revolving the negative pressure in the vicinity of the radially inner region of the disk 12 disappears, and hence the both bellows 24 extend by the force of the respective springs 28. As a result the lifter member 30 ascends and lifts the suspension arm 20 to sufficiently separate the head 22 from the disk 12.

Figure 4:
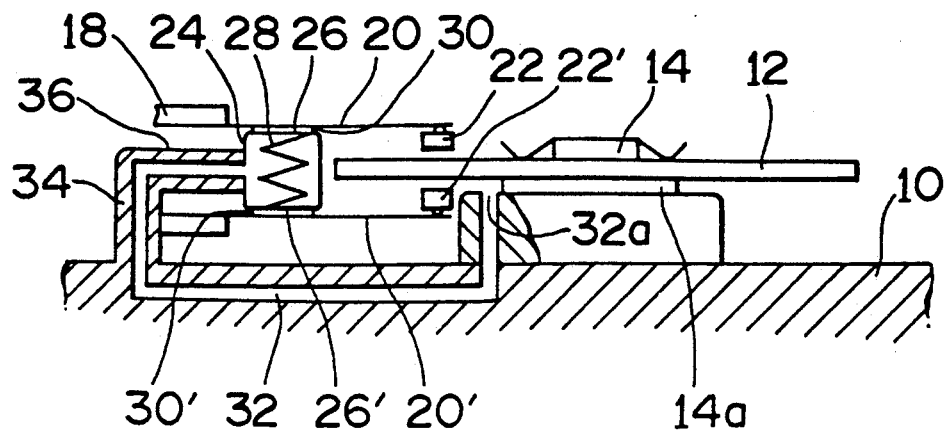
FIGS. 4 and 5 show a modification of the head lifting mechanism shown in FIG. 2 to simultaneously lift two heads which are for access to two opposite surfaces of the disk, respectively.
Figure 5:
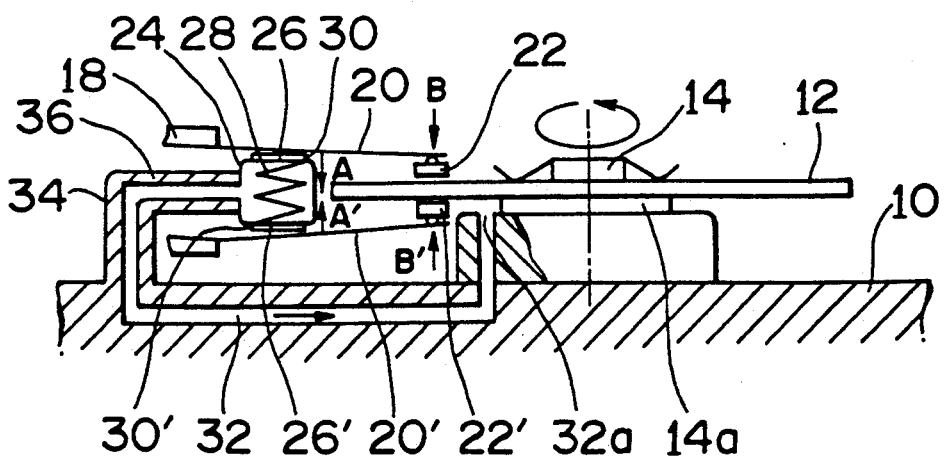

In practical magnetic disk units it is usual to utilize the both major surfaces of each magnetic disk as data storage surfaces. FIGS. 4 and 5 illustrate a modification of the magnetic disk unit of FIGS. 1–3 by the addition of another magnetic head 22' for access to the rear surface of the disk 12. Similarly to the head 22 shown in FIGS. 1–3, the second head 22' is attached to the free end of a second suspension arm 20' which extends from a second support arm 18'. The two suspension arms 20 and 20', with the respective heads 22 and 22' attached thereto, are arranged symmetrically with respect to the center plane of the disk 12.

The disk unit of FIGS. 4 and 5 also includes two bellows 24 which are positioned (in plan view) as shown in FIG. 1. In this case the two opposite ends of each bellows 24 are closed by end plates 26 and 26', respectively, and spring 28 biases the top end plate 26 upward and the opposite end plate 26' downward. For each bellows 24 a pillar 34 stands on the base 10 of the disk unit, and an arm 36 extends from the pillar 34 at a height correponding to the level of the disk 12, and the bellows 24 is fixed to the extended end of the arm 36 in a limited area of the side wall of the bellows 24. To lift the suspension arm 20 to which the first head 22 for access to the top surface of disk 12 is attached, the lifter member 30 shown in FIGS. 1–3 is fixed to the top end plates 26 of the two bellows 24. The opposite end plate 26' of each bellow 24 is at a level above the level of the suspension arm 20' to which the second head 22' for access to the opposite surface of the disk 12 is attached, and a second lifter member 30' is fixed at its two opposite ends to the end plates 26' of the two bellows 24. The second lifter member 30' has the same beam-like shape as the first lifter member 30 shown in FIG. 1. The pressure transmitting passage 32 extends through the pillar 34 and arm 36 for each bellow 24 and reaches an opening in the side wall of the bellows 24.

When the disk 12 is not rotating each bellows 24 is in the expanded state, and, as shown in FIG. 4, by the force of the spring 28 in the bellows 24 the first lifter member 30 on the top end plate 26 lifts the first suspension arm 20 thereby to keep the head 22 apart from the top surface of the disk 12, while the second lifter member 30' on the opposite end plate 26' oppositely "lifts" the second suspension arm 20' thereby to keep the second head 22' apart from the opposite surface of the disk 12. When the disk 12 is rotated by the operation of the spindle motor 14 a negative pressure is transmitted to the interior of each bellows 24 through the passage 32, whereby the both bellows 24 contract as indicated by arrows A and A' in FIG. 5. Naturally the two lifter members 30 and 30' move in the contracting directions A and A', respectively. Consequently the two suspension arms 20 and 20' are freed from the support by the respective lifter members 30 and 30', and, as indicated by arrows B and B', the two heads 22 and 22' come very close to the two opposite surfaces of the rotating disk 12, respectively.

Figure 6:
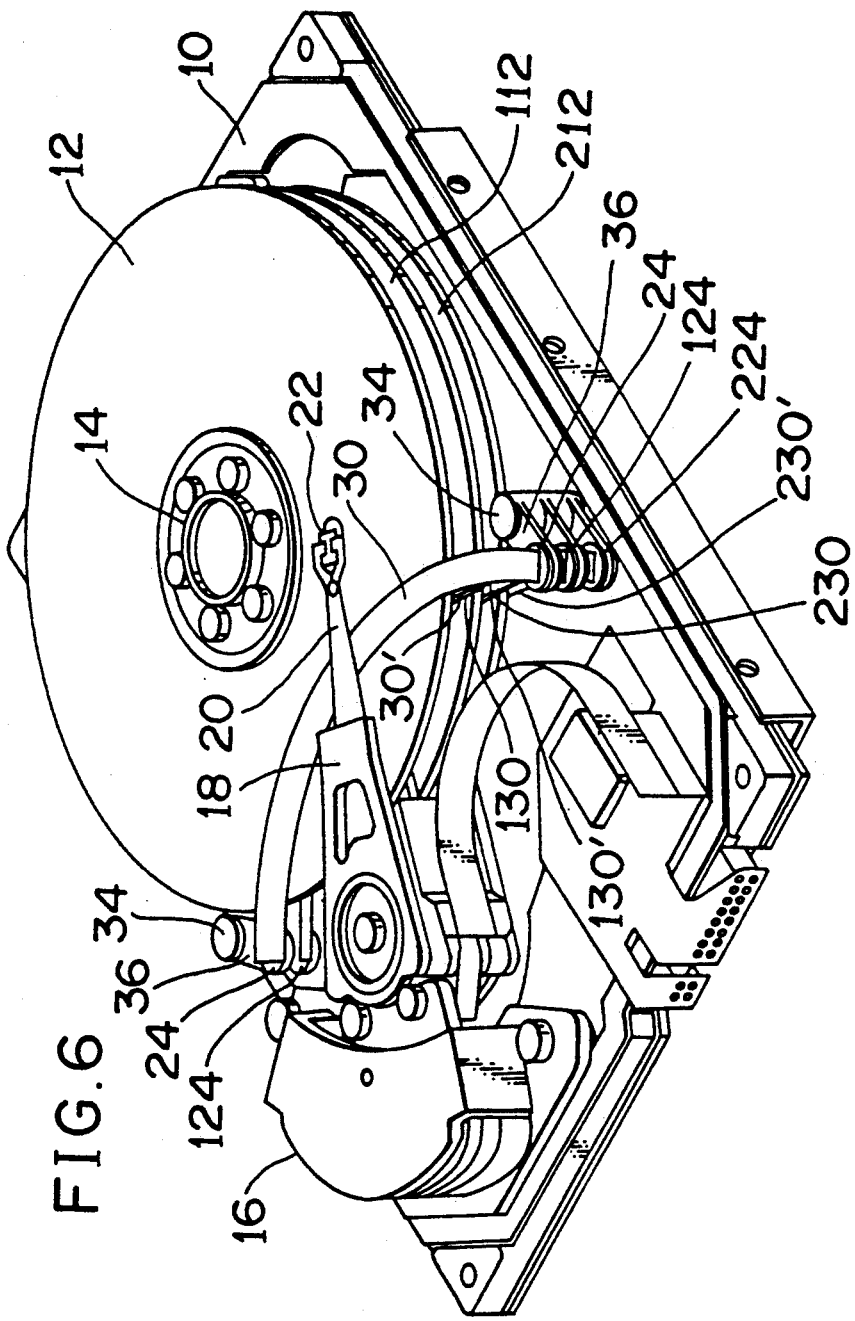
FIG. 6 is a perspective view of a magnetic disk unit which has three parallel and coaxially installed magnetic disks and includes a head lifting mechanism according to the invention.
Figure 7:
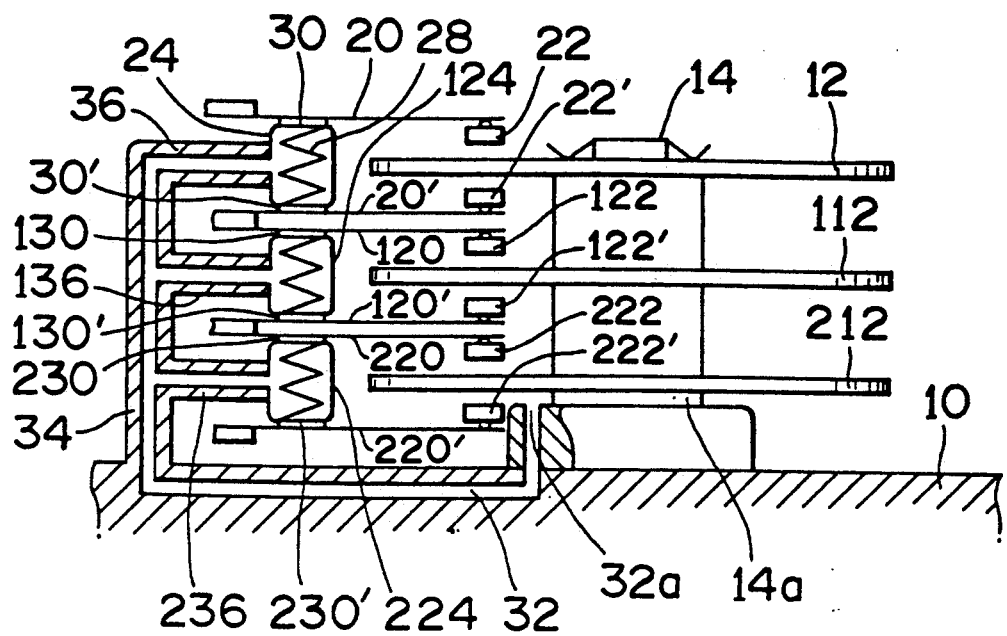
FIG. 7 is a schematic side elevational view, partly in section, of the head lifting mechanism in the disk unit of FIG. 6.

FIGS. 6 and 7 show a magnetic disk unit having three magnetic disks 12, 112, 212 coaxially coupled with a spindle motor 14. Each of the three disks has two data storage surfaces, and accordingly two magnetic heads are provided for each disk, viz., two oppositely arranged heads 22, 22' for the first disk 12, two oppositely arranged heads 122, 122' for the second disk 112 and two oppositely arranged heads 222, 222' for the third disk 212. The six heads 22, 22', 122, 122', 222, 222' are respectively attached to six suspension arms 20, 20', 120, 120', 220, 220' which are in interleave arrangement with the disks. For each of the six suspension arms there is a beam-like lifter member similar to that shown in FIGS. 1–3 fixed at its two ends to two bellows similar to the bellows shown in FIG. 4. That is, three pairs of lifter members 30, 30'; 130, 130'; 230, 230' are arranged parallel to each other by using a set of three bellows 24, which are in alignment in the direction of expansion-contraction, to hold one ends of the respective pairs of lifter members and another set of three bellows 24, which are in alignment in the direction of expansion-contraction, to hold the opposite ends of the respective pairs of lifter members. For each set of three bellows 24 a pillar 34 stands on the base 10 of the disk unit, and three parallel arms 36, 136, 236 extend from the pillar 34, and the three bellows 24 are respectively fixed to the extended ends of the three arms 36, 136, 136 each in the manner as described with reference to FIG. 4. The passage 32 for the transmission of a negative pressure extends through the pillar 34 and the three arms 36, 136, 236 to communicate with the interior of every bellows 24.

It will readily be understood that in the disk unit of FIGS. 6 and 7 the operation of each pair of the lifter members 30, 30' (130, 130'; 230, 230') is as described with respect to the counterpart in FIGS. 4 and 5, and that the three pairs of lifter members operate simultaneously.

Figure 9:
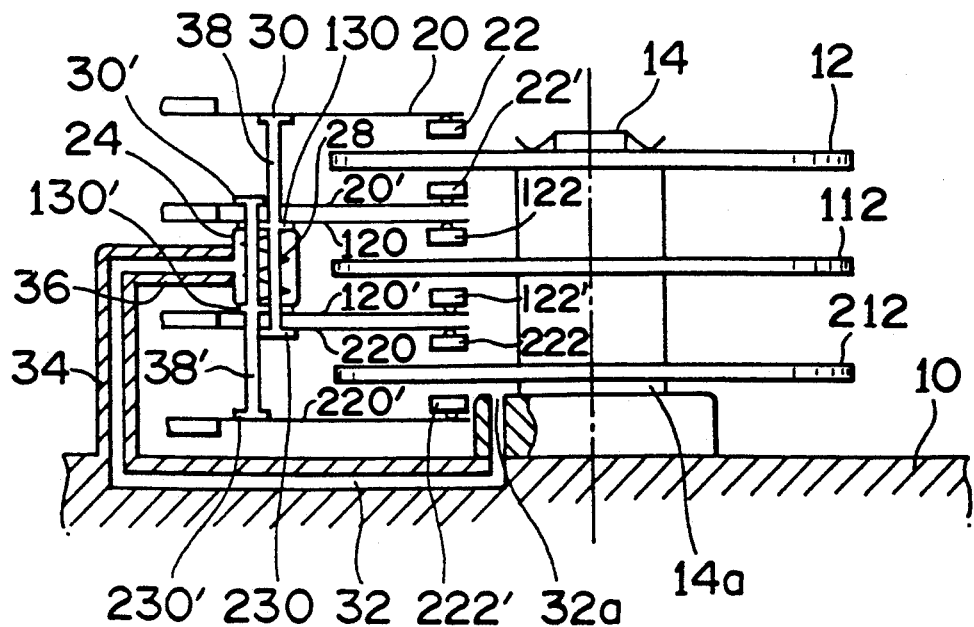
FIG. 9 is a schematic side elevational view of the head lifting mechanism in the disk unit of FIG. 8.
Figure 8:
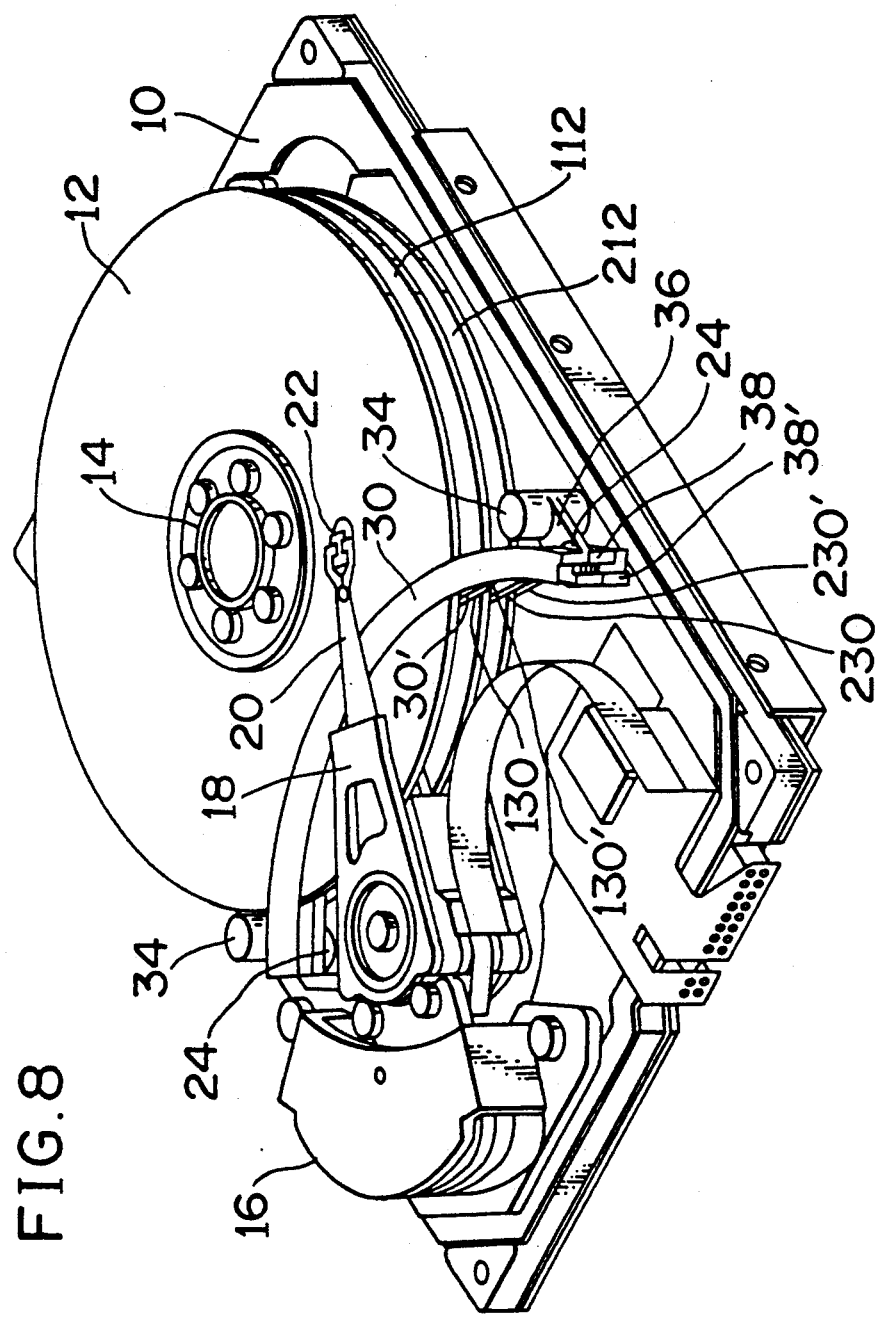
FIG. 8 is a perspective view of a magnetic disk unit which is similar to the disk unit of FIG. 6 except for a modification of the construction of the head lifting mechanism.

FIGS. 8 and 9 show a modification of the lifting mechanism shown in FIGS. 6 and 7. Also in this case the disk unit has three pairs of beam-like lifter members 30, 30'; 130, 130'; 230, 230' for the three disks 12, 112, 212, but only two bellows 24 are used to hold all the lifter members at two opposite ends thereof. The lifter member 30 for the magnetic head 22 for access to the top surface of the first disk 12, the lifter member 130 for the head 122 for access to the top surface of the second disk 112 and the lifter member 230 for the head 222 for access to the third disk 212 are fixed to each other at each ends thereof by a rigid bar 38, and only the lifter member 130 in the middle position is fixed to the top end plate 267 of each bellows 24. The remaining three lifter members 30', 130' and 230' are fixed to each other at each ends thereof by a rigid bar 38', and only the lifter member 130' in the middle position is fixed to the opposite end plate 26' of each bellows 24. That is, three lifter members 30, 130, 230 which have to be moved in the same direction are tied to each other by a pair of connecting bars 38 to each other, and the remaining three lifter members 30', 130', 230' which have to be moved in the opposite direction are tied to each other by a pair of connecting bars 38'. Each bellows 24 is held by an arm 36 extending from a pillar 34 standing on the base 10 in the same manner as in FIG. 4, and the pressure transmitting passage 32 communicates with the interior of each bellows 24 through the pillar 34 and the arm 36. The operation of the bellows 24 in FIGS. 8 and 9 is similar to the operation of the bellows 24 in FIGS. 4 and 5, or the bellows 124 in FIGS. 7 and 8. It will be apparent that the three pairs of lifter members 30, 30'; 130, 130'; 230, 230' in FIG. 9 are functionally identical with the counterparts in FIG. 7.

In applying the present invention to a magnetic disk unit having more than two disks it is possible to use either the method illustrated in FIG. 7 or the method illustrated in FIG. 9, and also it is possible particularly when the disk unit has more than three disks, to employ a combination of these two methods by using a plurality of pairs of bellows each of which moves a plurality of lifter members tied to each other.

Figure 10:
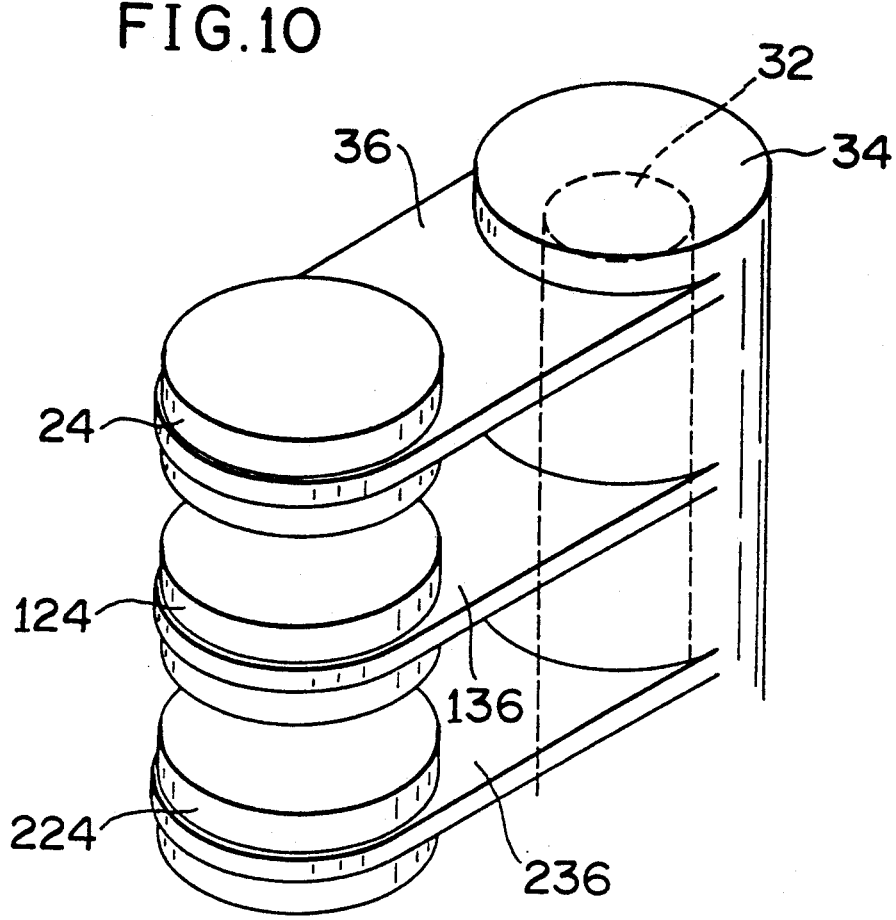
FIG. 10 is an enlarged perspective view of a power part of the head lifting mechanism shown in FIGS. 6 and 7.
Figure 11:
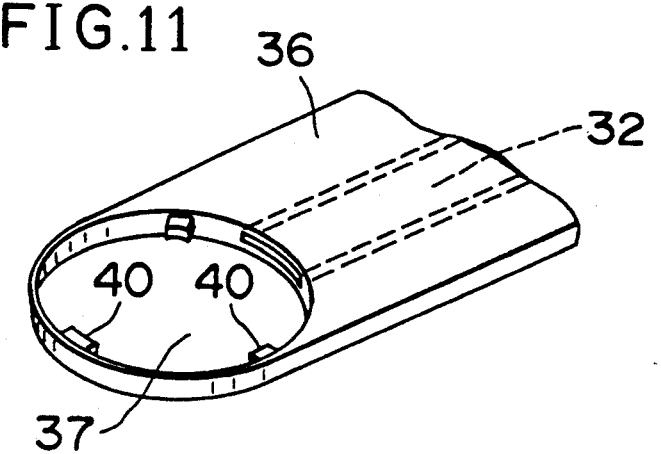
FIG. 11 is a perspective view of an arm member in the part shown in FIG. 10.
Figure 12:
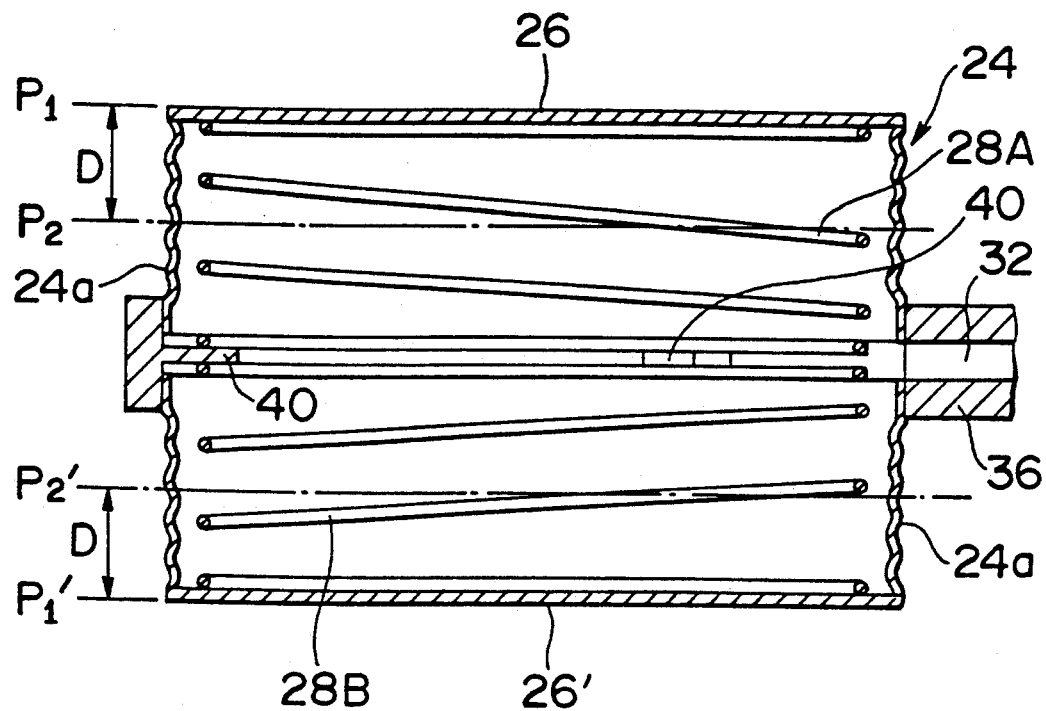
FIG. 12 is a sectional view of a bellows in the part shown in FIG. 10.

FIGS. 10-12 show a typical construction of the bellows 24 (or 124 or 224) and the manner of fixing the bellows to the arm 36 (or 136 or 236). The arm 36 is formed with a circular hole 37 in the end region remote from the pillar 34, and the pressure transmitting passage 32 opens in the hole 37. The diameter of the hole 37 corresponds to the outer diameter of the bellows 24, and a plurality of projections 40 on the cylindrical surface defining the hole 37. The bellows 24 has a cylindrical side wall 24a, which is extendable and contractable, and two flat end plates 26 and 26'. Initially the cylindrical side wall 24a is divided into two halves, and the two halves of the cylindrical walls 24a are respectively and oppositely fitted into the hole 37 of the arm 36. The both halves of the side wall 24a of the bellows 24 are airtightly fixed to the cylindrical surface defining the hole 37 of the arm 36, but in an area facing the open end of the pressure transmitting passage 32 in the arm 36 the side wall 24a of the bellows 24 has an opening so that the passage 32 communicated with the interior of the bellows 24. In an upper half of the bellows 24 a spring 28A is installed so as to bias the top end plate 26 outward. That is, the spring 28A is fixed at one end to the projections 40 of the arm 36 and at the opposite end to the innner surface of the top end plate 26. In the lower half of the bellows 24 another spring 28B is fixed at one end to the projections 40 and at the opposite end to the inner surface of the bottom end plate 26' of the bellows 24 in order to bias the end plate 26' outward.

When there is no difference in pressure between the interior and exterior of the bellows 24 in FIG. 12 the two end plates 26 and 26' are at the positions $P_1$ and $P_1'$, respectively. When a negative pressure is transmitted through the passage 32 to the interior of the bellows 24 by the rotation of the magnetic disk(s) at the predetermined speed the pressure in the bellows 24 becomes lower than the ambient pressure, whereby the bellows 24 contracts against the force of the springs 28A, 28B. As a result the position of the top end plate 26 lowers by a distance of D from the level $P_1$ to the level $P_2$, while the position of the bottom end plate 26' rises by the distance of D from the level $P_1'$ to the level $P_2'$.

What is claimed is:

1. A magnetic disk unit comprising:
   a rotatable magnetic disk for data storage;
   a magnetic head which flies above and in close proximity to a data storage surface of said magnetic disk for recording and reading data while the magnetic disk is rotating;
   supporting means for supporting said magnetic head and forcing said magnetic head toward said surface of said magnetic disk;
   lifting means for affecting said supporting means so as to lift said magnetic head to a position at a predetermined distance from said surface of said magnetic disk;
   releasing means for forcing said lifting means to stop affecting said supporting means while said magnetic disk is rotating, the releasing means being operative when a negative pressure is applied thereto; and
   pressure transmitting means for transmitting a negative pressure to said releasing means, said negative presuure being created below and in the vicinity of a radially inner region of said magnetic disk while the magnetic disk is rotating.

2. In a magnetic disk unit including a base, a spindle motor installed on the base, a magnetic disk for data storage which is rotatably coupled with the spindle motor so as to lie above said base, a magnetic head which is attached to a free end of a suspension arm for read/write operations on a data storage surface of the magnetic disk, and positioning means for supporting the suspension arm and selectively positioning the magnetic head relative to the data storage surface of the magnetic disk,
   the improvement comprising a head lifting mechanism which comprises a bellows which is linearly contractable and expandable and is mounted on said base, a lifter member fixed to a movable end face of said bellows and a pressure transmitting passage for transmitting a negative pressure created in a space between said base and a radially inner region of said disk when said disk is rotating at an operational speed to the interior of said bellows, said bellows and said lifter member being arranged such that in the absence of said negative pressure the bellows remains in an expanded state and forces the lifter member to support thereon said suspension arm so as to keep said head spaced from said data storage surface of said disk and such that when said negative pressure is created the bellows contracts to such an extend that said lifter member does not make contact with said suspension arm.

3. A magnetic disk unit according to claim 2, wherein said head lifting mechanism further comprises another bellows which is linearly contractable and expandable and substantially identical with said bellows and is mounted on said base at a distance from said bellows and a supplementary pressure transmitting passage for transmitting said negative pressure to the interior of said another bellows, said lifter member being a beam-like member which is fixed at one end to said movable end face of said bellows and at the opposite end to a movable end face of said another bellows, said bellows and said another bellows being located such that the beam-like lifter member is elongate in a direction transversely of said suspension arm.

4. A magnetic disk unit according to claim 2, further comprising another magnetic head which is attached to a free end of another suspension arm for read/write operations on the opposite data storage surface of said magnetic disk, said head lifting mechanism further comprising another lifter member fixed to an oppositely movable end face of said bellows, said bellows and said another lifter member being arranged such that in the absence of said negative pressure the bellows in the expanded state forces said another lifter member to support thereon said another suspension arm so as to keep said another magnetic head spaced from said opposite data storage surface of said disk and such that when the bellows contracts by the action of said negative pressure said another lifter member does not make contact with said another suspension arm.

5. In a magnetic disk unit including a base, a spindle motor installed on the base, a plurality of magnetic disks for data storage which are rotatably coupled with the spindle motor in a coaxial and parallel arrangement so as to lie above said base, for each data storage surface of each of the magnetic disks a magnetic read/write head which is attached to a free end of a suspension arm, and positioning means for supporting the suspension arms for the respective disks and selectively positioning each magnetic head relative to a data storage surface of the associated disk, the improvement comprising a head lifting mechanism which comprises a plurality of bellows which are linearly and simultaneously contractable and expandable and are mounted on said base, a pressure transmitting passage for transmitting a negative pressure created in a space between said base and a radially inner region of the magnetic disk closest to said base when the magnetic disks are rotating at an operational speed to the interior of each of said bellows and for each of the suspension arms a lifter member fixed to a movable end face of at least one of said bellows, said bellows and the lifter members being arranged such that in the absence of said negative pressure every bellows remains in an expanded state and forces each lifter member to support thereon the assigned suspension arm so as to keep the magnetic head attached to the assinged suspension arm separate from the assigned data storage surface of the assigned magnetic disk and such that when said negative pressure is created every bellows contracts to such an extent that each lifter member does not make contact with any of the suspension arms.

6. A magnetic disk unit according to claim 5, wherein the lifter member to support the suspension arm assigned to a data storage surface of a magnetic disk is fixed to a movable end face of a bellows, while the lifter member to support the suspension arm assigned to the opposite data storage surface of the same disk is fixed to an oppositely movable end face of the same bellows.

7. A magnetic disk unit according to claim 5, wherein for at least two adjacent magnetic disks the lifter members to respectively support the suspension arms assigned to the data storage surfaces on the same side of the respective disks are tied together by a connecting member to provide a first stack of lifter members, while the lifter members to respectively support the suspension arms assigned to the data storage surfaces on the opposite side of the respective disks are tied together by another connecting member to provide a second stack of lifter members, said first stack of lifter members being fixed to a movable end face of a bellows while said second stack of lifter members being fixed to an oppositely movable end face of the same bellows.

* * * * *

UNITED STATES PATENT AND TRADEMARK OFFICE
CERTIFICATE OF CORRECTION

PATENT NO. : 5,296,985
DATED : March 22, 1994
INVENTOR(S) : Mochizuki et al.

It is certified that error appears in the above-indentified patent and that said Letters Patent is hereby corrected as shown below:

Col. 1, line 40, delete "a s" and insert --as--;

Col. 6, line 60, delete "267" and insert --26--;

Col. 7, line 45, delete "innner" and insert --inner--;

Col. 8, line 17, delete "presuure" and insert --pressure--;

Col. 10, line 6, delete "assinged", and insert --assigned--.

Signed and Sealed this

Twenty-fifth Day of October, 1994

Attest:

BRUCE LEHMAN

Attesting Officer

Commissioner of Patents and Trademarks